United States Patent
Meki et al.

(10) Patent No.: US 11,566,684 B2
(45) Date of Patent: Jan. 31, 2023

(54) TOOTHED BELT

(71) Applicant: BANDO CHEMICAL INDUSTRIES, LTD., Kobe (JP)

(72) Inventors: Yoshitaka Meki, Kobe (JP); Atsushi Taga, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 383 days.

(21) Appl. No.: 16/852,210

(22) Filed: Apr. 17, 2020

(65) Prior Publication Data

US 2020/0240488 A1    Jul. 30, 2020

Related U.S. Application Data

(63) Continuation of application No. PCT/JP2019/008684, filed on Mar. 5, 2019.

(30) Foreign Application Priority Data

Apr. 4, 2018  (JP) .............................. JP2018-072201

(51) Int. Cl.
*F16G 1/28* (2006.01)
*B32B 3/30* (2006.01)
(Continued)

(52) U.S. Cl.
CPC .................. *F16G 1/28* (2013.01); *B32B 3/30* (2013.01); *B32B 5/024* (2013.01); *B32B 7/12* (2013.01);
(Continued)

(58) Field of Classification Search
CPC ..... F16G 1/28; F16G 1/10; B32B 2/30; B32B 5/024; B32B 7/12; B32B 25/10;
(Continued)

(56) References Cited

U.S. PATENT DOCUMENTS 4,721,496 A * 1/1988 Yokoyama ................ F16G 5/20
474/263
4,895,555 A * 1/1990 Watanabe ................. F16G 1/28
474/263
(Continued)

FOREIGN PATENT DOCUMENTS

JP    H10-299836 A    11/1998
JP    2018-525580 A    9/2018
(Continued)

OTHER PUBLICATIONS

International Search Report in PCT application No. PCT/JP2019/008684 dated Jun. 4, 2019.
(Continued)

*Primary Examiner* — Craig M Schneider
*Assistant Examiner* — David R Deal
(74) *Attorney, Agent, or Firm* — Maschoff Brennan

(57) ABSTRACT

In a toothed belt including a toothed belt body and a reinforcing cloth, the toothed belt body includes a rubber composition and has a base part formed into a flat band shape and a plurality of rubber tooth parts, which are arranged integrally with one face of the base part and spaced apart from each other in a belt lengthwise direction. The reinforcing cloth is attached to the toothed belt body to cover a face, of the toothed belt body, with the rubber tooth parts. Each of the rubber tooth parts is covered with the reinforcing cloth in a corresponding one of cloth-covered tooth parts where a rate of a volume of the reinforcing cloth with respect to a volume of the cloth-covered tooth part is 60% or more.

4 Claims, 4 Drawing Sheets

(51) Int. Cl.
 *B32B 5/02* (2006.01)
 *B32B 7/12* (2006.01)
 *B32B 25/10* (2006.01)
 *F16G 1/10* (2006.01)

(52) U.S. Cl.
 CPC ............... *B32B 25/10* (2013.01); *F16G 1/10* (2013.01); *B32B 2260/021* (2013.01); *B32B 2260/048* (2013.01); *B32B 2262/0261* (2013.01); *B32B 2413/00* (2013.01); *B32B 2433/04* (2013.01)

(58) Field of Classification Search
 CPC ........ B32B 2260/02; B32B 2262/0261; B32B 433/04; B32B 2433/04
 See application file for complete search history.

(56) References Cited

U.S. PATENT DOCUMENTS

| | | | | |
|---|---|---|---|---|
| 5,268,221 A * | 12/1993 | Nakanishi | ............ | D02G 3/447 474/260 |
| 5,545,097 A * | 8/1996 | Kitazumi | ............ | F16G 1/28 474/266 |
| 6,007,897 A * | 12/1999 | Tamaki | ............ | F16G 1/28 474/271 |
| 10,988,614 B2 * | 4/2021 | Yamada | ............ | C08G 18/4858 |
| 2002/0193196 A1 * | 12/2002 | Tani | ............ | F16G 5/20 474/263 |
| 2004/0214675 A1 * | 10/2004 | Beck | ............ | F16G 1/28 474/263 |
| 2007/0178792 A1 * | 8/2007 | Yoshida | ............ | F16G 1/28 442/293 |
| 2008/0286529 A1 * | 11/2008 | Sueto | ............ | F16G 1/28 428/167 |
| 2010/0120566 A1 * | 5/2010 | Izu | ............ | F16G 1/28 474/205 |
| 2011/0237374 A1 * | 9/2011 | Nakao | ............ | F16G 1/08 474/205 |
| 2015/0148163 A1 * | 5/2015 | Kusano | ............ | F16H 7/023 264/293 |
| 2015/0148165 A1 * | 5/2015 | Matsuda | ............ | F16G 1/21 474/264 |
| 2015/0152941 A1 | 6/2015 | Sekiguchi et al. | | |
| 2018/0313431 A1 * | 11/2018 | McNamee | ............ | F16G 3/10 |
| 2019/0276954 A1 * | 9/2019 | Tomoda | ............ | F16G 5/06 |
| 2020/0240488 A1 * | 7/2020 | Meki | ............ | B32B 25/14 |
| 2021/0054904 A1 * | 2/2021 | Tamura | ............ | F16G 1/28 |

FOREIGN PATENT DOCUMENTS

| | | |
|---|---|---|
| WO | 2014/024377 A1 | 7/2016 |
| WO | 2017/019618 A1 | 2/2017 |

OTHER PUBLICATIONS

Written Opinion in PCT application No. PCT/JP2019/008684 dated Jun. 4, 2019.

* cited by examiner

TOOTHED BELT

CROSS-REFERENCE TO RELATED APPLICATIONS

This is a continuation of International Application No. PCT/JP2019/008684 filed on Mar. 5, 2019, which claims priority to Japanese Patent Application No. 2018-072201 filed on Apr. 4, 2018. The entire disclosures of these applications are incorporated by reference herein.

BACKGROUND

Toothed belts are used for power transmission in general industrial applications, electric power steering, and the like. For the purposes of enhancement of durability of tooth parts of the toothed belt and the like, the tooth parts are covered with canvas.

For example, Japanese Patent Application Publication No. H10-299836 discloses a toothed belt in which tooth parts are covered with a tooth cloth. In addition, the above document discloses that dimensions of respective parts of the toothed belt are defined and in particular, when a diameter of a cord is D mm and a thickness of the tooth cloth is T mm, $0.65 \leq D/2 + T \leq 0.85$ is satisfied.

SUMMARY

Hereinafter, a technique to enhance durability of a toothed belt, in particular, durability of a toothed belt having small pitches used for noise reduction will be described.

In a toothed belt includes a toothed belt body and a reinforcing cloth, the toothed belt body includes a rubber composition and has a base part formed into a flat band shape and a plurality of rubber tooth parts, which are arranged integrally with one face of the base part and spaced apart from each other in a belt lengthwise direction. The reinforcing cloth is attached to the toothed belt body to cover a face, of the toothed belt body, with the rubber tooth parts. Each of the rubber tooth parts is covered with the reinforcing cloth in a corresponding one of cloth-covered tooth parts where a rate of a volume of the reinforcing cloth with respect to a volume of the cloth-covered tooth part is 60% or more.

According to the present disclosure, durability of the toothed belt is enhanced.

DETAILED DESCRIPTION

Figure 1:
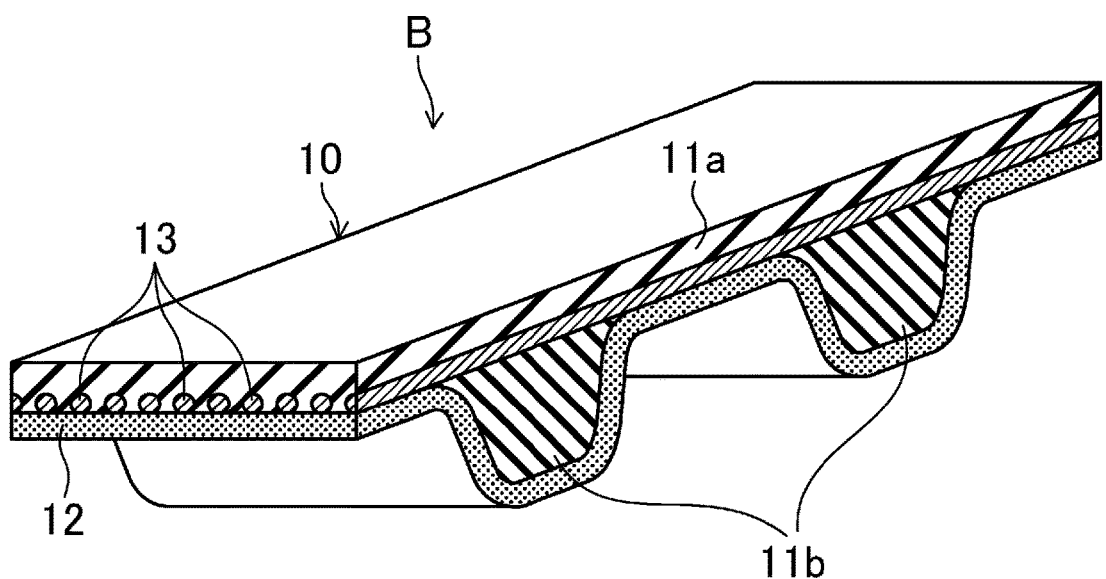
FIG. 1 is a perspective view schematically illustrating a configuration of an exemplary toothed belt of the present disclosure.

Hereinafter, an embodiment of the present disclosure will be described with reference to the accompanying drawings. FIG. 1 is a perspective view schematically illustrating an exemplary toothed belt B of the present embodiment.

The toothed belt B includes an endless toothed belt body 10 includes a rubber composition. The toothed belt body 10 has a base part 11a formed into a flat belt shape, and a plurality of rubber tooth parts 11b that are arranged at constant pitches, spaced apart from each other in a belt lengthwise direction and formed integrally with a face of one side of the base part 11a, that is, on an inner peripheral face of the base part 11a. The toothed belt body 10 includes a tooth part side reinforcing cloth 12 attached thereto to cover a face of, the toothed belt body 10, with the rubber tooth parts. In addition, cords 13 are embedded in the inner peripheral face of the base part 11a of the toothed belt body 10 such that each of the cords 13 forms a helical pattern with a pitch in a belt widthwise direction.

The toothed belt B of a first embodiment is suitably used, for example, as a belt transmission device in a machine tool or the like, in particular, as a power transmission member for a belt transmission device in the machine tool. The toothed belt B of the embodiment has, for example, a belt length of 70 mm to 3000 mm, a belt width of 6 mm to 200 mm, and a belt thickness of 1 mm to 20 mm. In addition, each of the rubber tooth parts 11b has, for example, a width of 0.63 mm to 16.46 mm, a height of 0.37 mm to 9.6 mm, and a pitch of 1.0 mm to 31.75 mm.

In a suitable example, the toothed belt has the following dimensions. Specifically, the belt length is suitably 250 mm to 400 mm. The belt width is suitably 10 mm to 40 mm. The belt thickness is suitably 1.3 mm to 3.0 mm. The width of each of the rubber tooth parts 11b is suitably 1.3 mm to 2.6 mm. The height of each of the rubber tooth parts 11b is suitably 0.7 mm to 1.4 mm. The pitch of each of the rubber tooth parts 11b is suitably 2.0 mm to 3.0 mm Each of the rubber tooth parts 11b of the toothed belt body 10 may be a trapezoidal tooth viewed from side, or a semicircular shape viewed from side, or may have other shapes. Each of the rubber tooth parts 11b may be formed to extend in the belt widthwise direction or may be a helical extending in a direction inclined to the belt widthwise direction.

Example of a rubber component of the rubber composition of which the toothed belt body 10 is made may include: hydrogenated acrylonitrile rubber (H-NBR); hydrogenated acrylonitrile rubber (H-NBR) reinforced with an unsaturated carboxylic acid metal salt; ethylene-α-olefin elastomer such as ethylene propylene copolymer (EPR), ethylene-propylene-diene terpolymer (EPDM), ethylene-octene copolymer, and ethylene-butene copolymer; chloroprene rubber (CR); chlorosulfonated polyethylene rubber (CSM); and the like. The rubber component of the rubber composition of which the toothed belt body 10 is made is suitably a blend rubber including one or more than two kinds of the rubber components cited above. Among these, H-NBR is suitable.

H-NBR reinforced with unsaturated carboxylic acid metal salt may include, as unsaturated carboxylic acid, methacrylic acid, acrylic acid, and the like, and, as metal, zinc, calcium, magnesium, aluminum and the like.

Examples of a rubber compound ingredient may include e a reinforcing material, a processing aid, a vulcanization accelerator aid, a plasticizer, a co-crosslinking agent, a crosslinking agent, a vulcanization accelerator, an antioxidant, and the like.

Regarding the reinforcing material, examples of the carbon black may include channel black; furnace black such as SAF, ISAF, N-339, HAF, N-351, MAF, FEF, SRF, GPF, ECF, and N-234; thermal black such as FT and MT; acetylene black; and the like. Silica may also be used as the reinforcing material. The reinforcing material is suitably comprised of one kind or two or more kinds of these. The content of the reinforcing material is, for example, 20 to 60 parts by mass with respect to 100 parts by mass of the rubber component of the rubber composition.

Examples of the processing aid may include stearic acid, polyethylene wax, and metal salt of fatty acid, and the like. The processing aid is suitably comprised of one kind or two or more kinds of these. The content of the processing aid is, for example, 0.5 to 2 parts by mass with respect to 100 parts by mass of the rubber component of the rubber composition.

Examples of the vulcanization accelerator aid may include metal oxide such as zinc oxide (zinc white) and magnesium oxide; a metal carbonate; a fatty acid; a derivative thereof; and the like. The vulcanization accelerator aid is suitably comprised of one kind or two or more kinds of these. The content of the vulcanization accelerator aid is, for example, 3 to 7 parts by mass with respect to 100 parts by mass of the rubber component of the rubber composition.

Examples of the plasticizer may include dialkyl phthalate such as dibutyl phthalate (DBP) and dioctyl phthalate (DOP); dialkyl adipate such as dioctyl adipate (DOA); dialkyl sebacate such as dioctyl sebacate (DOS), and the like. The plasticizer is suitably one kind or two or more kinds of these. The content of the plasticizer is, for example, 0.1 to 40 parts by mass with respect to 100 parts by mass of the rubber component.

Examples of the co-crosslinking agent may include liquid rubber such as liquid NBR; and the like. The co-crosslinking agent is suitably comprised of one kind or two or more kinds. The content of the co-crosslinking agent is, for example, 3 to 7 parts by mass with respect to 100 parts by mass of the rubber component.

Examples of the crosslinking agent may include sulfur; organic peroxide; and the like. As the crosslinking agent, sulfur or organic peroxide may be blended, or both of them may be blended. The content of the crosslinking agent in the case of sulfur is, for example, 1 to 5 parts by mass with respect to 100 parts by mass of the rubber component of the rubber composition. The content of the crosslinking agent in the case of the organic peroxide is, for example, 1 to 5 parts by mass with respect to 100 parts by mass of the rubber component of the rubber composition.

Examples of the vulcanization accelerator may include a thiuram-based agent (for example, TETD, TT, TRA, or the like); a thiazole-based agent (for example, MBT, MBTS, or the like); a sulfenamide-based agent (for example, CZ or the like), and a dithiocarbamate-based agent (for example, BZ-P or the like), and the like. The vulcanization accelerator is suitably comprised of one kind or two or more kinds of these. The content of the vulcanization accelerator is, for example, 2 to 5 parts by mass with respect to 100 parts by mass of the rubber component of the rubber composition.

Examples of the antioxidant may include an amine-ketone-based antioxidant, a diamine-based antioxidant, a phenol-based antioxidant, and the like. The antioxidant is suitably comprised of one kind or two or more kinds of these. The content of the antioxidant is, for example, 0.1 to 5 parts by mass with respect to 100 parts by mass of the rubber component.

Note that the rubber composition of which the toothed belt body 10 is formed may contain short fibers each having a fiber diameter of 10 μm or more.

The cords 13 are formed of twisted yarn including glass fiber, aramid fiber, polyamide fiber, polyester fiber, or the like. It is suitable that the glass fiber is used. The diameter of each of the cords 13 is, for example, 0.2 mm to 2.5 mm. The distance between the centers of the neighboring cords 13 in a cross section is, for example, 0.5 mm to 1.0 mm. The cords 13 have been subjected to adhesion treatment to have adhesiveness to the toothed belt body 10.

Next, the tooth part side reinforcing cloth 12 includes, for example, a fabric material, such as woven fabric, knitted fabric, and unwoven fabric, made of yarn of cotton, polyamide fiber, polyester fiber, aramid fiber, or the like. Yarn of nylon fiber, which is one kind of the polyamide fiber, is suitably used. The tooth part side reinforcing cloth 12 suitably has extensibility.

To enhance durability of the toothed belt B, it is desirable that the tooth part side reinforcing cloth 12 occupies a predetermined volume in the tooth parts. This will be described with reference to FIG. 2.

Figure 2:
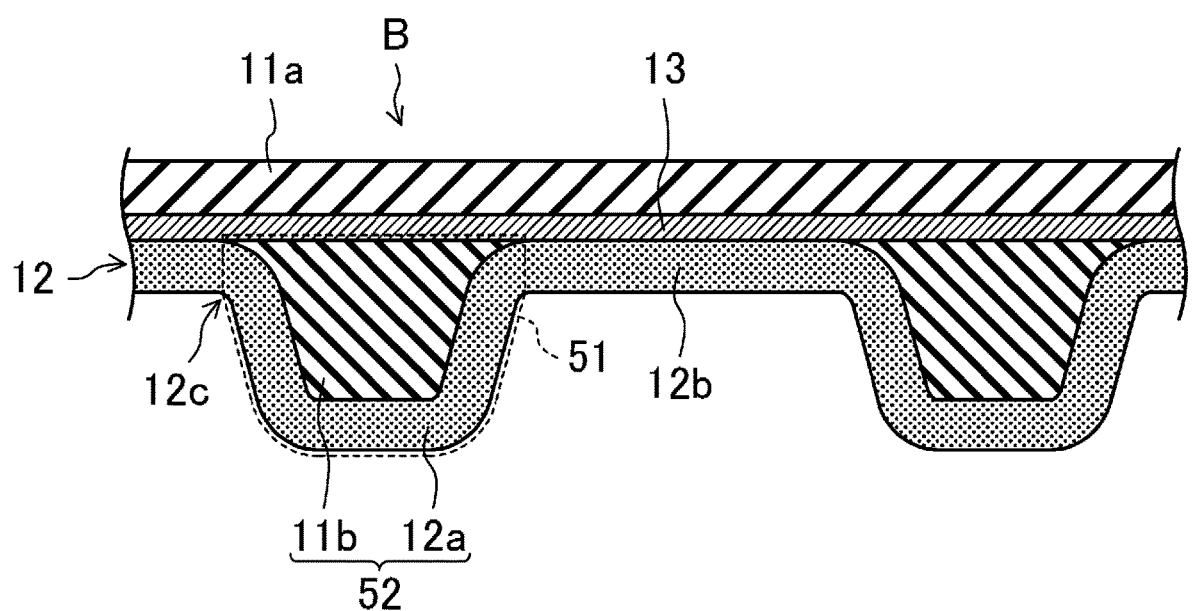
FIG. 2 is a side view of the toothed belt in FIG. 1.

FIG. 2 is a view schematically illustrating the toothed belt B in FIG. 1 viewed from its side. As explained with reference to FIG. 1, the tooth part side reinforcing cloth 12 is attached to a face of, the toothed belt body 10, with the rubber tooth parts 11b (lower side in FIG. 2).

Turn to a cloth-covered tooth part 52 including a corresponding one of the rubber tooth parts 11b and the tooth part side reinforcing cloth 12 (which is referred to as a tooth part cloth 12a, while a portion covering a portion of the base part 11a, which is not provided with one of the rubber tooth parts1 11b, is referred to as a base part cloth 12b) which covers each of the rubber tooth parts 11b.

In the cloth-covered tooth part 52, the rate of a volume occupied by the tooth part cloth 12a (hereinafter, also referred to as a cloth rate) is increased, thereby enhancing the durability of the toothed belt B. In particular, when the tooth part cloth 12a occupies 60% or more of a volume of the cloth-covered tooth part 52 (the cloth rate is 60% or more), the durability is remarkably enhanced. Furthermore, when the toothed belt B is broken after use for a long period of time, breakage due to wear of the tooth part side reinforcing cloth 12 is more likely to occur than breakage due to cracks in the belt body. This is desirable as the form of the breakage of the toothed belt.

The cloth rate in cloth-covered tooth part 52 can be calculated based on, for example, the area occupied by the tooth part cloth 12a on the side face of the belt. In the toothed belt B shown in FIGS. 1 and 2, shapes of each of the rubber tooth parts 11b and the tooth part cloth 12a are identical in any position in the widthwise direction of the belt. Accordingly, in FIG. 2, by determining the rate of the area occupied by the tooth part cloth 12a (a portion, of the tooth part side reinforcing cloth 12, within a range indicated by a broken line 51) with respect to the cloth-covered tooth part 52 (a portion surrounded by the broken line 51), the rate of the volume occupied by the tooth part cloth 12a in the cloth-covered tooth part 52 can be calculated.

In a case where the side face of the belt is inclined to a back face of the belt, the rate of the area occupied by the tooth part cloth 12a in the side face of the belt may not coincide with the rate of the volume occupied by the tooth part cloth 12a in the cloth-covered tooth part 52. Also in this case, however, a required cloth rate can be calculated in consideration of the shape of the cloth-covered tooth part 52.

Note the following: In the tooth part side reinforcing cloth 12, a boundary 12c between the tooth part cloth 12a covering the rubber tooth parts 11b and the base part cloth 12b covering the base part 11a is perpendicular to a surface of the base part 11a. In addition, it is assumed that the tooth part cloth 12a is curved in an arc shape in a root portion of each of the rubber tooth parts 11b, and that at a point where the arc ends, the boundary 12c is located.

Further, the area of each part on the side face of the toothed belt B is determined, for example, by capturing an image and measuring the area based on the image captured.

Note that the tooth part side reinforcing cloth 12 may be subjected to processing such as impregnation with glue rubber. In this case, the volume of the impregnated glue rubber is included in the volume of the tooth part side reinforcing cloth 12.

To increase the rate of the volume occupied by the tooth part cloth 12a, it is preferable to thicken the tooth part cloth 12a (the tooth part side reinforcing cloth 12). For this purpose, it is possible to employ a method such as a method of thickening the yarn constituting the tooth part side reinforcing cloth 12 and a method of increasing the thread count of the yarn to be driven. The thickness of the clothe is also affected by variations of knitting methods of the knitted fabric (plain stich, rib stich, or the like) and variations of weaving of the woven fabric (plain weave, twill weave, or the like).

(Method for Manufacturing Toothed Belt B)

The method for manufacturing the toothed belt B of the first embodiment will be described with reference to FIGS. 3 to 6.

Figure 3:
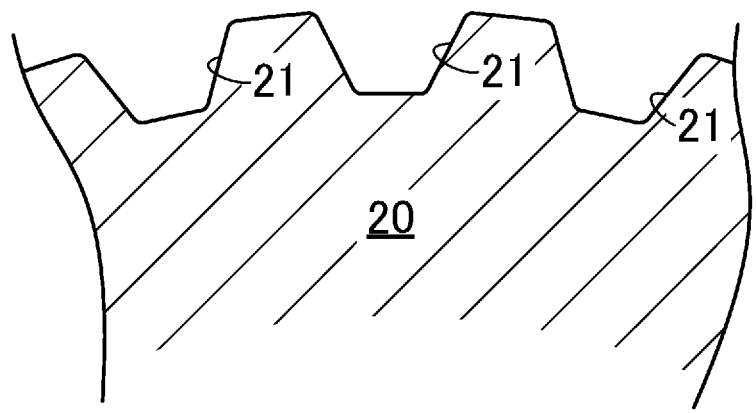
FIG. 3 is a view illustrating one step of a method for manufacturing the toothed belt in FIG. 1.

FIG. 3 shows a belt forming mold 20 used for manufacturing the toothed belt B of the first embodiment.

The belt forming mold 20 is cylindrical, and includes, on an outer peripheral face thereof, tooth part forming grooves 21 each extending in an axial direction formed at constant pitches and spaced apart from each other in a circumferential direction.

The method for forming the toothed belt of the first embodiment includes a material preparation step, a molding step, a crosslinking step, and a finishing step.

<Material Preparation Step>

—Base Part and Uncrosslinked Rubber Sheets 11' for Tooth Parts—

Various rubber compound ingredients are added to a rubber component which is being masticated, and kneading is continuously performed.

The uncrosslinked rubber composition obtained is molded into a sheet shape by calender molding or the like to produce a base part and uncrosslinked rubber sheets 11' for tooth parts.

—Tooth Part Side Reinforcing Cloth 12'—

A tooth part side reinforcing cloth 12' is subjected to adhesion treatment. Specifically, the tooth part side reinforcing cloth 12' is subjected to RFL adhesion treatment in which the tooth part side reinforcing cloth 12' is soaked in an RFL aqueous solution and heated. Further, the tooth part side reinforcing cloth 12' undergoes a primary coat adhesion treatment, as necessary, in which the tooth part side reinforcing cloth 12' is soaked in a primary coat adhesion treatment fluid prior to the RFL adhesion treatment and heated. Furthermore, after the RFL adhesion treatment, the tooth part side reinforcing cloth 12' is subjected to soaking rubber cement adhesion treatment in which the tooth part side reinforcing cloth 12' is soaked in rubber cement and is dried and/or is subjected to coating rubber cement adhesion treatment in which a face on a side of the toothed belt body 10 is coated with rubber cement and is dried, as necessary.

Subsequently, both ends of the tooth part side reinforcing cloth 12' subjected to the adhesion treatment are joined to each other and formed into a cylindrical shape.

—Cords 13'—

The cords 13' are subjected to adhesion treatment. Specifically, the cords 13' are subjected to RFL adhesion treatment in which the cords 13' are soaked in a resorcin-formalin latex aqueous solution (hereinafter, referred to as an "RFL aqueous solution") and are heated. Further, prior to the RFL adhesion treatment, the cords 13' are subjected to primary coat adhesion treatment in which the cords 13' are soaked in a primary coat adhesion treatment liquid and are heated and/or rubber cement adhesion treatment in which after the RFL adhesion treatment, the cords 13' are soaked in rubber cement and are dried, as necessary.

<Molding Step>

Figure 4:
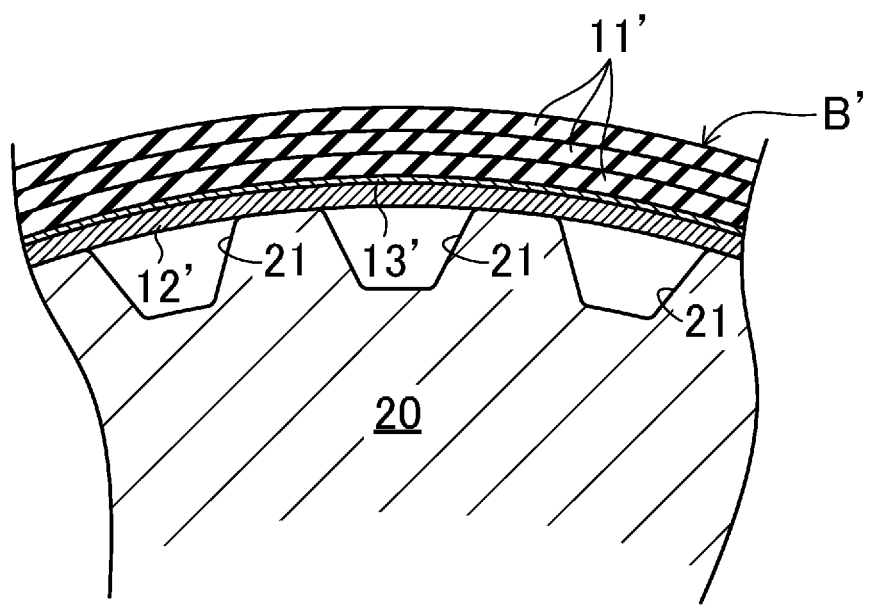
FIG. 4 is a view illustrating another step of the method for manufacturing the toothed belt in FIG. 1 following the step of FIG. 3.

As shown in FIG. 4, the tooth part side reinforcing cloth 12' covers the outer circumference of the belt forming mold 20, the cords 13' are wound thereon in a helical pattern, and the uncrosslinked rubber sheets 11' are wound further thereon. At this time, a laminated molded body B' is formed on the belt forming mold 20. Note the following: The uncrosslinked rubber sheets 11' may be used such that a grain direction corresponds to the belt lengthwise direction, or may be used such that the grain direction corresponds to the belt widthwise direction.

<Crosslinking Step>

Figure 5:
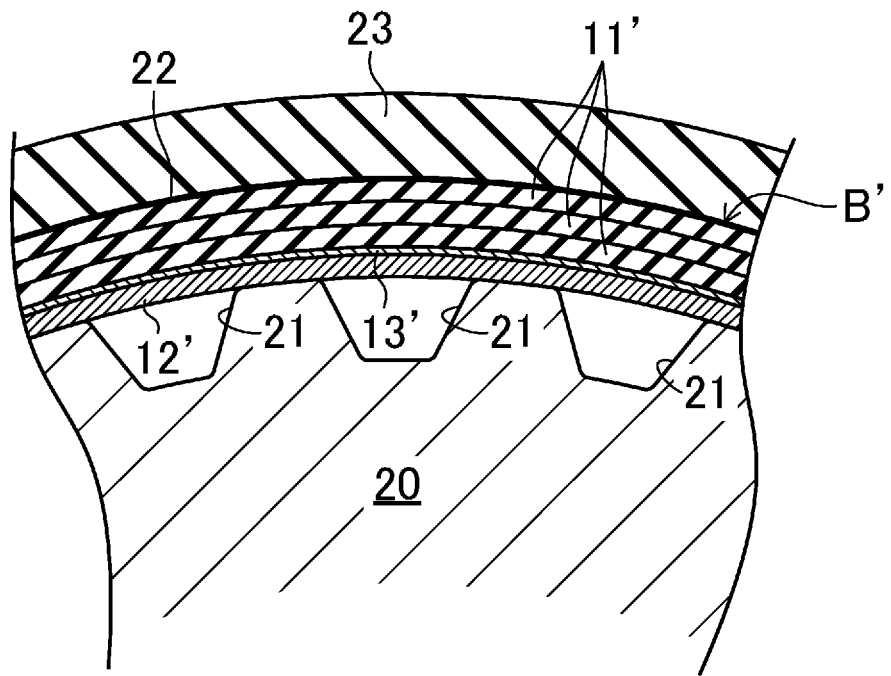
FIG. 5 is a view illustrating still another step of the method for manufacturing the toothed belt in FIG. 1 following the step of FIG. 4.
Figure 6:
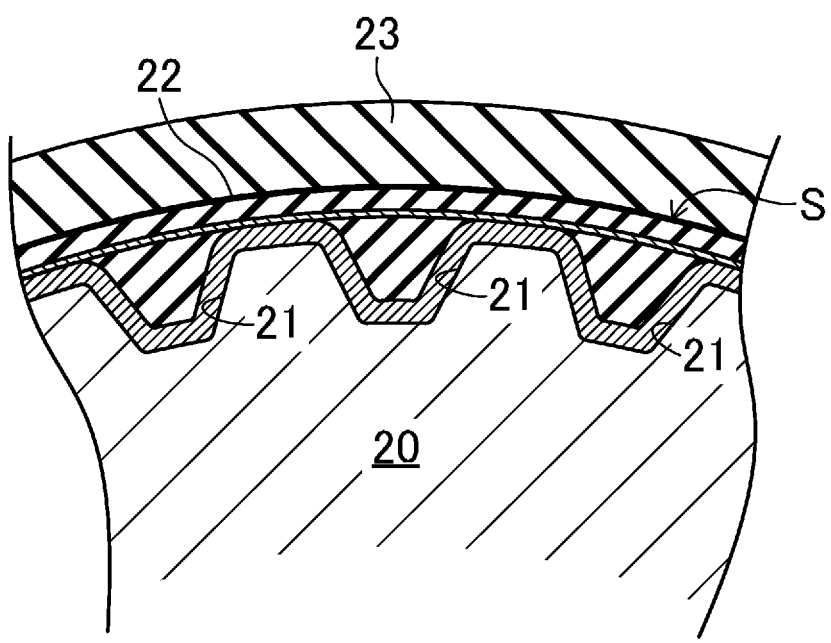
FIG. 6 is a view illustrating yet another step of the method for manufacturing the toothed belt in FIG. 1 following the step of FIG. 5.

As shown in FIG. 5, mold release paper 22 is wound around the outer circumference of the laminated molded body B', a rubber sleeve 23 is then covered thereon, and the resultant is placed inside a vulcanizer. The vulcanizer is sealed and filled with vapor having a high temperature and a high pressure, and is held for a predetermined molding time. At this time, the uncrosslinked rubber sheets in the laminated molded body B' flows into the tooth part forming grooves 21 of the belt forming mold 20 while pressing the tooth part side reinforcing cloth 12'. Meanwhile, the crosslinking is promoted in the uncrosslinked rubber sheets, which are integrated with the tooth part side reinforcing cloth 12' and the cords 13'. Finally, as shown in FIG. 6, a cylindrical belt slab S is molded. The belt slab S is molded at a temperature of, for example, 100° C. to 180° C. under a molding pressure of, for example, 0.5 to 2.0 MPa for a molding time of, for example, 10 to 60 minutes.

<Finishing Step>

The inside of the vulcanizer is depressurized to relieve the sealing, and the belt slab S molded between the belt forming mold 20 and the rubber sleeve 23 is removed and released from the mold. The back face side of the belt slab S is polished so that the thickness is adjusted. Thereafter, the belt slab S is cut into rings each having a predetermined width, thereby manufacturing the toothed belt B.

EXAMPLES (Uncrosslinked Rubber Composition)

As described below, rubber 1 of an uncrosslinked rubber composition for forming a toothed belt body and rubber 2 of an uncrosslinked rubber composition for a rubber cement adhesion layer of the tooth part side reinforcing cloth were prepared.

<Rubber 1>

H-NBR (trade name: Zetpol 2020 manufactured by Zeon Corporation), was masticated. Inputted thereto and kneaded therewith were, with respect to 100 parts by mass of H-NBR, 40 parts by mass of FEF carbon black (trade name: Seast SO manufactured by TOKAI CARBON CO., LTD.) as a reinforcing material; 1 part by mass of stearic acid (trade name: STEARIC ACID CAMELLIA manufactured by NOF CORPORATION) as a processing aid; 5 parts by mass of zinc oxide (trade name: Zinc Oxide No. 2 (JIS) manufactured by Sakai Chemical Industry Co., Ltd.) as a vulcanization accelerator aid; 10 parts by mass of a plasticizer; 5 parts by mass of liquid NBR (trade name: Nipol 1312 manufactured by Zeon Corporation) as a co-crosslinking agent; 0.5 part by mass of sulfur (trade name: Oil Sulfur manufactured by NIPPON KANRYU INDUSTRY CO., LTD) as a crosslinking agent; 2 parts by mass of a thiuram-based vulcanization accelerator (trade name: NOCCELER TET-G manufactured by OUCHI SHINKO CHEMICAL INDUSTRIAL CO., LTD.); and 2 parts by mass of an amine-ketone-based antioxidant (trade name: NOCRAC 224 manufactured by OUCHI SHINKO CHEMICAL INDUSTRIAL CO., LTD.), thereby preparing an uncrosslinked rubber composition. This uncrosslinked rubber composition is referred to as "Rubber 1."

<Rubber 2>

Zinc methacrylate reinforced H-NBR (trade name: Zeoforte ZSC 2295 manufactured by Zeon Corporation) and H-NBR (trade name: Zetpol 2020 manufactured by Zeon Corporation) were masticated with a mixing mass ratio of the former and the latter of 50:50, and inputted thereto and kneaded therewith were, with respect to 100 parts by mass of these rubber components, 20 parts by mass of FEF carbon black (trade name: Seast SO manufactured by TOKAI CARBON CO., LTD.) as a reinforcing material; 10 parts by mass of ultra-high molecular weight polyethylene powder (trade name: MIPELON XM-220 manufactured by Mitsui Chemicals, Inc.) as a friction coefficient reducing material; 0.5 part by mass of sulfur (trade name: Oil Sulfur manufactured by NIPPON KANRYU INDUSTRY CO., LTD) as a crosslinking agent; 2 parts by mass of a thiuram-based vulcanization accelerator (trade name: NOCCELER TET-G manufactured by OUCHI SHINKO CHEMICAL INDUSTRIAL CO., LTD.); and 2 parts by mass of an amine-ketone-based antioxidant (trade name: NOCRAC 224 manufactured by OUCHI SHINKO CHEMICAL INDUSTRIAL CO., LTD.), thereby preparing an uncrosslinked rubber composition. This uncrosslinked rubber composition is referred to as "Rubber 2."

(Tooth Side Reinforcing Cloth)

A twill cloth was used as a cloth for constituting the tooth side reinforcing cloth 12. Regarding the twill cloth, the fiber fineness of warp and weft, and the thread counts of the warp and the weft were set, thereby preparing four kinds of cloths a, b, c, and d having respectively different thicknesses. As will be described later, test belts A to D for evaluation were produced by using the above cloths a to d.

Table 1 shows the fiber fineness and the numbers of the driven pieces of the yarn of the cloths a to d.

Regarding the cloth a, the fiber fineness of the warp was 44 dt (decitex) and the thread count of the warp was 428 pieces/5 cm, and the fiber fineness of the weft is 78 dt and the thread count of the weft was 170 pieces/5 cm.

Regarding the cloth b, the fiber fineness of the warp was 44 dt and the thread count of the warp was 392 pieces/5 cm, and the fiber fineness of the weft was 156 dt and the thread count of the weft was 174 pieces/5 cm.

Regarding the cloth c, the fiber fineness of the warp was 44 dt and the thread count of the warp was 370 pieces/5 cm, and the fiber fineness of the weft was 312 dt and the thread count of the weft was 130 pieces/5 cm.

Regarding the cloth d, the fiber fineness of the warp was 210 dt and the thread count of the warp was 177 pieces/5 cm, and the fiber fineness of the weft was 155 dt and the thread count of the weft was 191 pieces/5 cm.

These twill cloths a to d were each subjected to RFL adhesion treatment in which each of the cloths was soaked in an RFL aqueous solution and then heated. Furthermore, the twill cloths a to d thus subjected to the RFL adhesion treatment were subjected to soaking rubber cement adhesion treatment in which each of the cloths was immersed in rubber cement and dried. Rubber cement having a solid concentration of 10% by mass, in which the rubber 1 was dissolved in toluene as a solvent, was used as the rubber cement. The liquid temperature of the rubber cement was 25° C. The period of soaking time in the rubber cement was five seconds. The drying temperature after the immersion in the rubber cement was 100° C., and the period of drying time was 40 seconds.

TABLE 1

| Belt | Cloth (Twill Cloth) | Cloth Rate (Volume %) | Fiber Fineness | | Thread Count (Counts/5 cm) | |
|---|---|---|---|---|---|---|
| | | | Warp | Weft | Warp | Weft |
| A | a | 37% | 44 | 78 | 428 | 170 |
| B | b | 46% | 44 | 156 | 392 | 174 |
| C | c | 55% | 44 | 312 | 370 | 130 |
| D | d | 61% | 210 | 155 | 177 | 191 |

(Cords)

As the cords, cords made of fiber including glass fiber were used.

(Test Toothed Belts for Evaluation)

The rubber 1 as the uncrosslinked rubber composition of which the toothed belt body was formed and the twill cloths a, b, c and d described above as the tooth reinforcing cloth were used, thereby preparing four test toothed belts A, B, C and D for evaluation having the tooth side reinforcing cloths 12 with different thicknesses. The test toothed belts have a belt width of 6 mm, and a belt length of 330 mm.

Regarding each of the toothed belts thus prepared for evaluation, an image of a side face thereof was captured, and the rate (cloth rate) of a volume occupied by the tooth part cloth 12a with respect to a cloth-covered tooth part 52 was calculated based on the image captured. The four test toothed belts A to D for evaluation respectively had the cloth rates of 37%, 46%, 55% and 61% in the stated order. These are also shown in Table 1.

(Test Evaluation Method)

Figure 7:
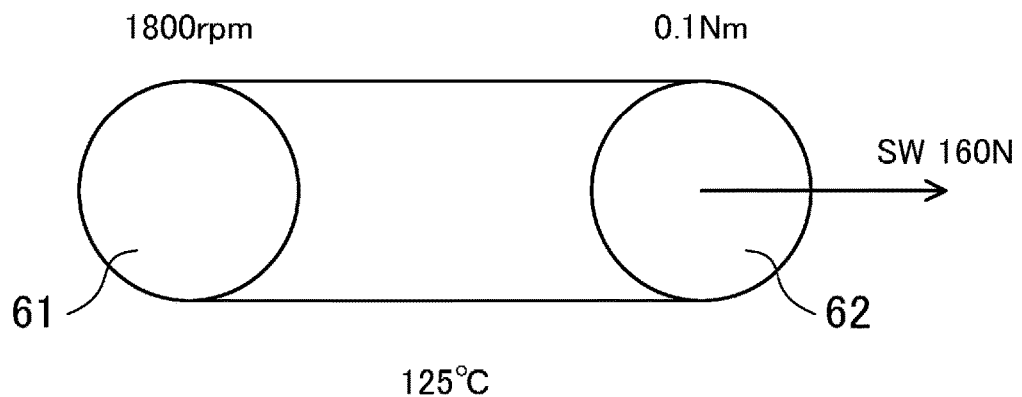
FIG. 7 is a view illustrating a pulley layout of a heat-resistant running tester used in the present disclosure.

FIG. 7 shows a layout of pulleys of a heat resistant running tester. A driving pulley 61 and a driven pulley 62 which were 41 teeth S2M timing pulleys were arranged side by side in a horizontal direction in the tester. A load of 160 N was applied to the driven pulley 62 on a side thereof opposite to the driving pulley 61. Under conditions of a torque of 0.1 Nm and the number of revolutions of 1800 rpm, each of the belts was run. The ambient temperature was 125° C.

Figure 8:
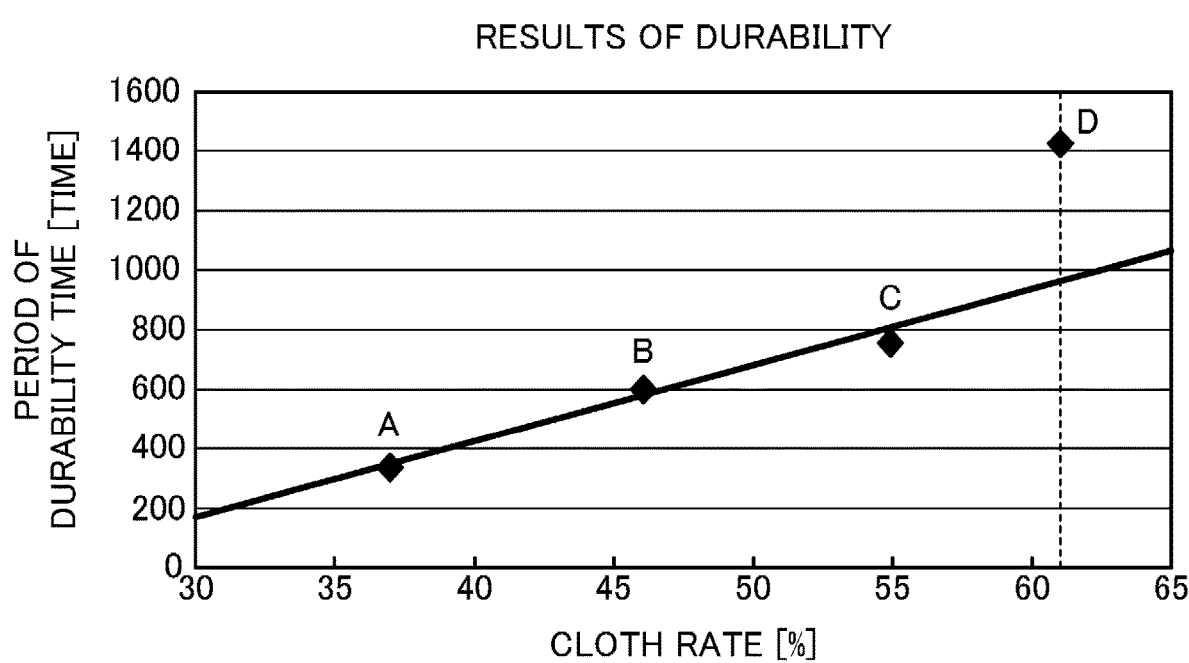
FIG. 8 is a diagram showing durability test results of test belts for evaluation in the present disclosure.

The period of time until breakage occurred in each of the toothed belts was measured, which was made to be a period of durability time. FIG. 8 shows the results of the four test toothed belts for evaluation.

As shown in FIG. 8, regarding the test toothed belts A, B and C (with cloth rates of 37%, 46% and 55%) for evaluation, points indicating the periods of durability time with respect to the cloth rates are substantially aligned on a straight line L. On the other hand, regarding the test toothed belt D for evaluation with the cloth rate of 61%, a point indicating the period of durability time was misaligned from the straight line L, which means that the period of durability time was greatly increased. Specifically, if the point indicating the period of durability time of the test toothed belt with the cloth rate of 61% should be aligned on the straight line L, the period of durability time would be estimated to be approximately 950 hours. In fact, the period of durability time of the test toothed belt D for evaluation in the test result exceeded 1400 hours.

By thickening the reinforcing cloth, the durability of the toothed belt was enhanced, and in particular, by setting the rate (cloth rate) of the volume occupied by the tooth part cloth 12a in the cloth-covered tooth part 52, including the rubber tooth part 11b and the tooth part cloth 12a, to a predetermined rate or more, remarkable and non-continuous enhancement was obtainable. To achieve this, it is suitable to set the cloth rate to 60% or more.

In addition, in the case of each of the test toothed belts A to C for evaluation, the breakage of the belt was caused by cracks. In other words, in each of these toothed belts, the cracks in the toothed belt body 10 occurred before the tooth part side reinforcing cloth 12 was worn. On the other hand, in the case of the test toothed belt D for evaluation, the breakage of the belt was caused by the wear of the tooth part side reinforcing cloth 12. In other words, in the test toothed belt D for evaluation, the tooth part side reinforcing cloth 12 was worn before the cracks in the toothed belt body 10 occurred.

In a case of a toothed belt having a tooth part side reinforcing cloth 12, it is desirable that the breakage occurs due to the wear of the tooth part side reinforcing cloth 12 rather than due to the cracks. If the cloth rate is less than 60% (as in each of the test toothed belts A to C for evaluation), when a high load was applied thereto, the cracks occurred not due to deterioration of rubber but due to concentration of stress on the toothed belt body 10 which resulted from broken pieces of yarn and torn fabric of the tooth part side reinforcing cloth 12. This means that the wear resisting function of the tooth part side reinforcing cloth 12 is not effectively utilized in this case. On the other hand, when the cloth rate is 60% or more (as in the test toothed belt D for evaluation), the tooth part side reinforcing cloth 12 showed the function of wear resistance, and as a result, the tooth part side reinforcing cloth 12 was worn, resulting in breakage. Thus, the occurrence of the breakage due to the wear of the tooth part side reinforcing cloth 12 indicates that the tooth part side reinforcing cloth 12 functions as such. Accordingly, also in this regard, the test toothed belt D for evaluation with the cloth rate of 60% or more is more desirable than the other test toothed belts.

The toothed belts of the present disclosure are useful for various power transmissions since they are highly durable and are prone to be broken due to the wear of the tooth parts in case of breakage.

What is claimed is:

1. A toothed belt, comprising a toothed belt body and a reinforcing cloth, the toothed belt body including a rubber composition and having a base part formed into a flat band shape and a plurality of rubber tooth parts, the rubber tooth parts being arranged integrally with one face of the base part and spaced apart from each other in a belt lengthwise direction, the reinforcing cloth being attached to the toothed belt body to cover a face, of the toothed belt body, with the rubber tooth parts, each of the rubber tooth parts being covered with the reinforcing cloth in a corresponding one of cloth-covered tooth parts where a rate of a volume of the reinforcing cloth with respect to a volume of the cloth-covered tooth part is 60% or more.

2. The toothed belt of claim 1, wherein the reinforcing cloth is attached to the toothed belt body via an adhesion layer, and the adhesion layer comprises H-NBR rubber.

3. The toothed belt of claim 1, wherein the toothed belt includes cords embedded to extend in a lengthwise direction of the toothed belt body and made of glass fiber, the rubber composition constituting the toothed belt body comprises H-NBR as a rubber component, and the reinforcing cloth comprises nylon.

4. The toothed belt of claim 1, wherein the plurality of cloth-covered tooth parts are arranged at a pitch of 2 mm or more and 3 mm or less.

* * * * *